United States Patent [19]

Enescu et al.

[11] Patent Number: 5,287,444
[45] Date of Patent: Feb. 15, 1994

[54] MESSAGE PROCESSING SYSTEM

[75] Inventors: Michael A. Enescu, Sunnyvale; James Lum; Ronald L. Obermarck, both of Redwood City; Kurt A. Shoens, San Jose, all of Calif.

[73] Assignee: International Business Machines Corporation, Armonk, N.Y.

[21] Appl. No.: 393,133

[22] Filed: Aug. 14, 1989

[51] Int. Cl.$^5$ .............................. G06F 15/20
[52] U.S. Cl. ................................ 395/148
[58] Field of Search ............... 364/518, 521, 523, 419; 340/721, 723, 716; 382/10; 395/144-149

[56] References Cited

U.S. PATENT DOCUMENTS

| | | | |
|---|---|---|---|
| 3,161,763 | 12/1964 | Glaser | 364/200 |
| 4,365,315 | 12/1982 | Jamnik | 364/900 |
| 4,731,735 | 3/1988 | Borgendale et al. | 364/200 |
| 4,748,589 | 5/1988 | Kanon et al. | 364/900 |
| 4,853,875 | 8/1989 | Brown | 364/200 |

FOREIGN PATENT DOCUMENTS 0121071 10/1984 European Pat. Off. ..... G06F 3/023 A

OTHER PUBLICATIONS

"Variable Symbolic Data Substitution In System Messages", IBM Technical Disclosure Bulletin, vol. 28, No. 8, New York, U.S., Jan. 1986, p. 3624.

Sommerville et al., "The Eclipse User Interface", Software Practice & Experience, vol. 19, No. 4, Chichester, GB, Apr. 1989, pp. 371-391; p. 378, line 21-43; p. 379, line 10-24; and p. 387, line 25-35.

"Message Table Generator", IBM Technical Disclosure Bulletin, vol. 30, No. 6, New York, U.S., Nov. 1987, p. 68.

Primary Examiner—Heather R. Herndon
Attorney, Agent, or Firm—Kenneth C. Hill; Andrew J. Dillon

[57] ABSTRACT

A standardized message processing procedure is invoked by an application program to generate informative messages. Message repositories are provided in files accessible to the message processor. A separate repository is provided for each national language which is supported. The application invokes the message processor, passing variable information for inclusion in a message. The message processor retrieves the message syntax and fixed fields from the appropriate repository, assembles the message using information from the repository and information provided by the invoking application, and generates the message. A preprocessor can be used to generate the repository files, and macros suitable for inclusion in application source files to invoke the message processor.

8 Claims, 5 Drawing Sheets

MESSAGE PROCESSING SYSTEM

BACKGROUND OF THE INVENTION

1. Technical Field

The present invention relates generally to digital computer systems, and more specifically to a system for processing and displaying informative messages to a user of the computer system.

2. Background Art

Programs running on computer systems must communicate information to a user of the system and to other programs. Large programs, such as operating systems and product applications, have a large number of informative messages which must be communicated to a system operator or a user from time to time.

These messages may simply be informative messages, such as those informing a user that an action has been completed or a resource is now available. Some messages could be considered as warning messages, which inform a user that something is not as expected, such as a file not being in the expected format. Critical messages, or error messages, can be considered to be those messages which inform a user that an attempted action failed, such as an attempt to open a file which did not exist. A significant amount of code in large applications such as operating systems can be dedicated to handling such informative messages.

Messages to be read by a user or operator must be presented in a language understood by that person. These languages are often referred to as "national languages" to distinguish them from programming languages. The message generating code must be written with knowledge of the end user's national language. Changes and updates typically involve recompiling the entire application.

Since different national languages can vary quite significantly in syntax (for example, some national languages read right to left and others read left to right, and grammar varies from language to language), translation can be a time consuming task. In addition, significant changes can be introduced into the source code for the message handling subsystem. Maintenance and support becomes much more difficult for products made available in numerous countries having different national languages when different source code was used to generate that product for each different country. Errors found in one national language version will not necessarily be found in other versions, and updates and changes to the application as a whole becomes more difficult.

It would therefore be desirable to provide a message processing system for larger applications which did not need to be recompiled or re-link-edited for each change. Also, it would be desirable for such a message processing system to gracefully and flexibly handle different national languages without introducing a number of different source code versions.

SUMMARY OF THE INVENTION

It is therefore an object of the present invention to provide a message processing system for use with computer applications which is independent of the national language in which the messages are to be displayed.

It is another object of the present invention to provide such a message processing system which does not need to be recompiled or re-linked when changes are made to the messages supported by the system.

It is another object of the present invention to provide such a message processing system which can be used without modification for applications written in different programming languages.

Therefore, according to the present invention, a standardized message processing procedure is called by an application program to generate informative messages. Message repositories are provided in files accessible to the message processor. A separate repository is provided for each national language which is supported. The application calls the message processor, passing variable information for inclusion in a message. The message processor retrieves the message syntax and fixed fields from the appropriate repository, assembles the message using information from the repository and information provided by the calling application, and generates the message. A preprocessor can be used to generate the repository files, macros suitable for inclusion in application source files to call the message processor system, and to generate documentation. The preprocessor performs these functions using a single standard message description file as input.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

The description below explains the use of a message processor according to the present invention in the context of its use with an application program. It will be understood by those skilled in the art that such a message processing system may be used with many different types of applications, including operating systems.

Figure 1:
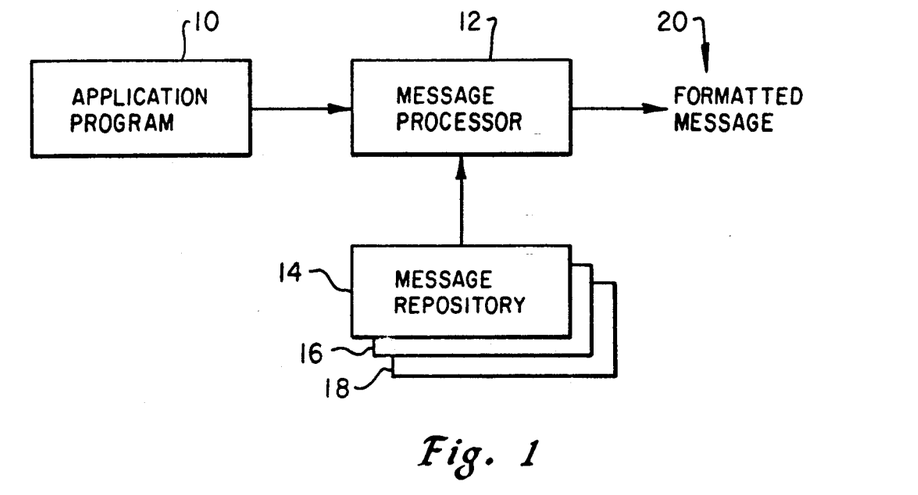
FIG. 1 is a high level block diagram showing the relationship of a message processor system to an application.

Referring to FIG. 1, an application program 10 executes on a general purpose digital computer as known in the art. The type of computer used is not important to the present invention, and may be, for example, a mainframe computer system, a desktop personal computer, or a personal workstation. The details of the application program 10 are also not important to the present invention. The application program 10 may be, for example, a real-time, multi-user operating system supporting graphics workstations connected to a network, or it may be a single-user application executing on a desktop personal computer.

A message processor 12 is a callable procedure which executes on the computer system. During operation, the message processor 12 reads in the contents of a message repository 14, which consists of information, described in more detail below, contained in a file. Additional message repositories 16, 18 may be provided.

Each message repository 14, 16, 18 contains information describing the message syntax and fixed fields for a different national language. Each message repository 14, 16, 18 corresponds to one national language. The message processor 12 obtains fixed field and syntax information from the message repository 14, combines it with variable information obtained from the application program 10, and generates an output string defining a formatted message 20.

Figure 2:
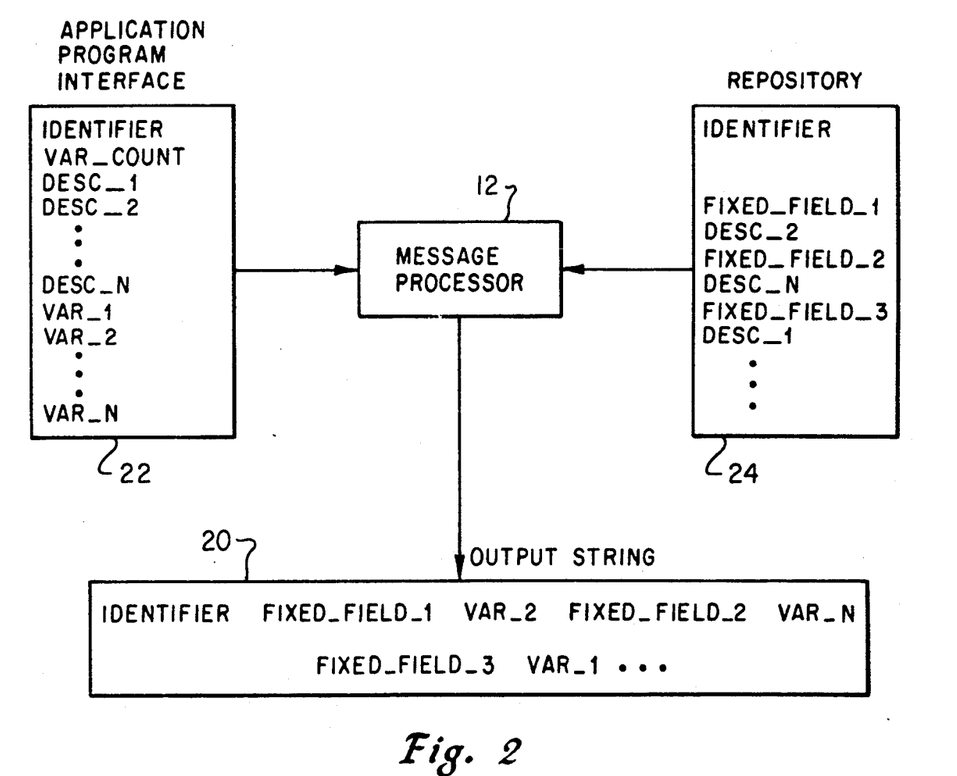
FIG. 2 illustrates the combination of fixed field and variable field information by the message processor to generate a message.

The data utilized by the message processor 12 in generating a formatted message 20 is illustrated in FIG. 2. The information passed to the message processor 12 from the application 10 is shown in block 22. The information obtained from an entry in the message repository 14 is shown in block 24. The information listed in blocks 22 and 24 is illustrative only, and may be modified as necessary to fit various application and system requirements.

When invoking the message processor 12, the application program 10 passes the information in box 22 to the message processor 12 in a data structure. It is possible to pass a copy of the entire data structure, but the application program 10 preferably passes only a pointer to a data structure, allowing that information to be accessed by the message processor 12. The first item in the data structure is a message IDENTIFIER, which is preferably an alphanumeric string identifying the message to be generated.

The second item passed to the message processor 12 is a count VAR_COUNT of the number of variables used by this message. A series of variable field descriptors DESC_1, ..., DESC_N, describe the field type and field name for each of the variable fields. A corresponding number of variable fields VAR_1, ..., VAR_N, contain the actual variable information.

When the message processor 12 is invoked, it extracts the message identifier and uses that information to search in the message repository 14. When the entry in the repository 14 is found which corresponds to the identifier, that entry is read in and used by the message processor 12 to format the message. The information shown in box 24 is a sample of one entry extracted from the repository 14.

Each entry in a message repository 14 includes an IDENTIFIER which is matched with the identifier provided by the application program 10. The entry then provides a series of fixed field strings and variable field descriptors in the order desired for the output message 20. Fixed fields provided by the repository entry are simply copied to the output string representing the formatted message 20, and the variables corresponding to each of the variable field descriptors are extracted from the data structure passed during the invocation of the message processor 12, formatted if necessary, and copied to the output string. The output string shown in FIG. 2 has alternating fixed fields and variable fields, but it is possible for both fixed fields and variables to be placed adjacent to other fields of the same type. In general, two adjacent fixed fields would be combined into a longer, single fixed field.

The output string 20 is therefore seen to have a format defined by an entry in the repository 14, and contains fixed fields provided by the repository 14 and variable field values provided by the application 10 through the invocation of the message processor 12. To use this system with a different national language, it is necessary only to define a different repository 16 or 18 as the message repository to be used by the message processor 12. The message processor 12 will then find the corresponding entry in such other message repository, and use that entry to provide the fixed fields and format for the formatted message 20. When a different message repository 16, 18 is selected, it would generally be expected that the fixed fields within the message repository would be different, being written in a different national language. In addition, the order in which the variable fields are inserted into the output string may also be different in order to generate an output message having correct syntax according to the other national language.

Since each of the variable descriptor fields provided during the invocation and found in the message repository 14 have associated variable field names, it is a fairly straightforward process for the message processor to match up the variables provided in box 22 with the corresponding positions defined in the repository entry. For example, in FIG. 2, the first variable field is DESC_2 which has a unique name associated therewith. The message processor 12 simply scans the names found in the variable field descriptors in box 22 until a match occurs. The corresponding variable is then copied into the output string.

Figure 3:
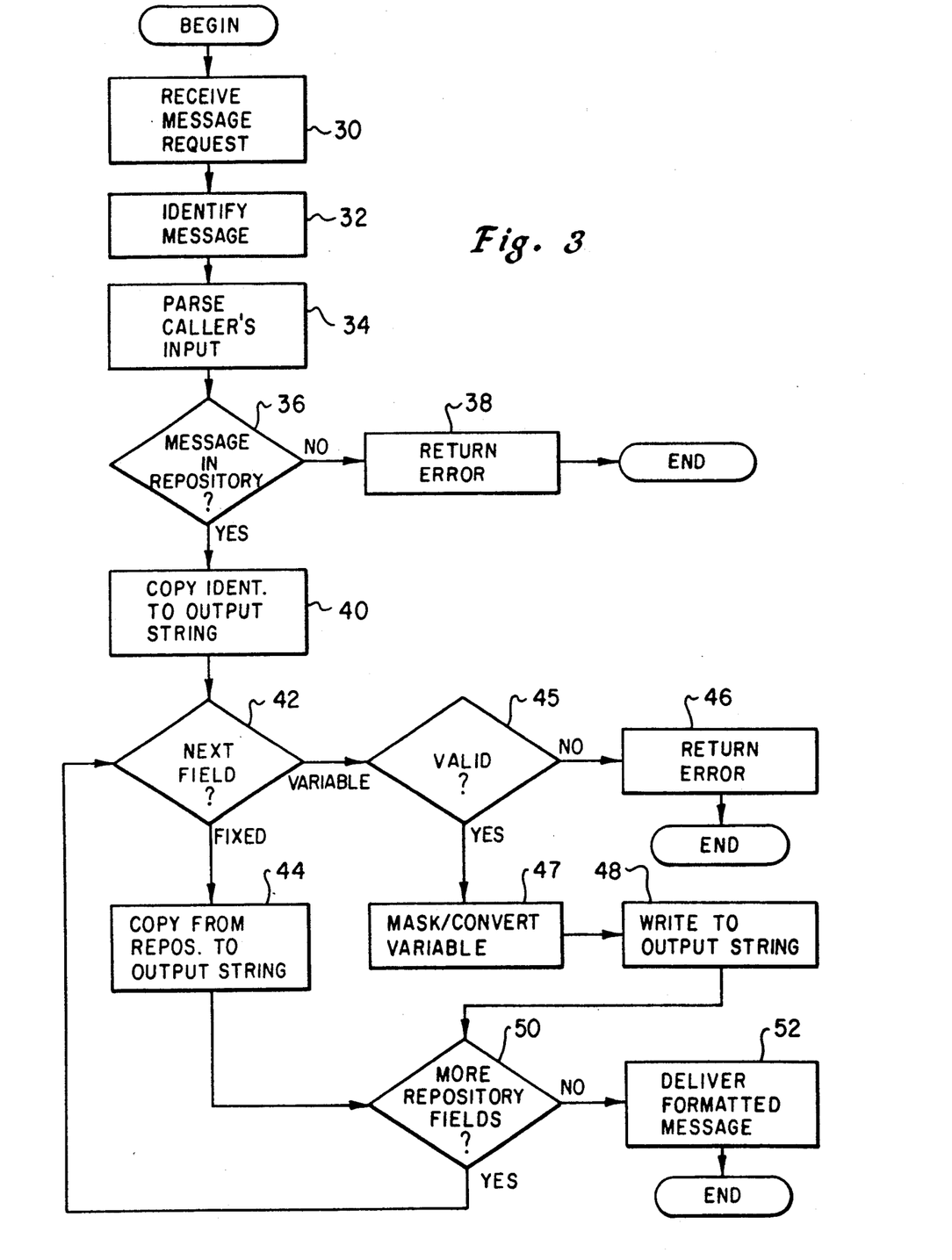
FIG. 3 is a flowchart describing the operation of the message processor.

The flowchart of FIG. 3 illustrates the operation of the message processor 12 during construction of the formatted message 20. The first step is to receive the message request 30. A message is requested by invoking the message processor 12 and passing to it a pointer to a structure containing the message identifier and variable fields as described above. The message processor 12 identifies the message 32 with the message identifier, and parses the input 34. Since the same invocation is used for all messages to be generated by the system, the message processor 12 must use the variable count field and variable field descriptors to extract the contents of each variable.

The message processor 12 then determines whether the requested message is contained in the message repository 36. First, the national language repository to be used is determined. This can be accomplished by, for example, testing the value of a global or system variable used for this purpose. The requested message identifier is then matched with those in the message repository file as described above. If the message is not defined in the repository, an error report is returned 38 and the message processor 12 returns to its invoker. Implementation of the error report returned at step 38 will be determined by the preferences of the system designer and any previously existing constraints provided by the system. One technique would be to generate a formatted message stating that there is an unknown error type, and including the contents of all of the variable fields passed to the message processor 12.

If the requested message is found in the message repository file, the message identifier is copied to the output string 40. The message processor 12 then begins scanning the entries read in from the message repository file. If the next field 42 is fixed, it is simply copied from the message repository entry to the current end of the output string 44. If the next field is a variable field descriptor, a check is made 45 to see if a corresponding field descriptor exists in the repository entry. If not, an error message is returned 46 and the process ends. If a corresponding field descriptor is located in the repository entry, the variable is located in the structure passed to the message processor 12 and converted 47, if necessary, and appended to the current end of the output string 48. The description field for each variable in the repository entry preferably contains information used in the conversion such as maximum field length, justification within the field, and so forth. Numeric variables are converted to printable strings in step 46 prior to appending them to the output string in step 48.

Once the message processor 12 has written information to the output string for a given field, a check is made to see if there are further fields described in the repository entry 50. If so, control returns to step 42. If not, the output string has been completely assembled, and the formatted message is delivered 52 to a location defined in the message repository entry. The formatted message may be delivered to, for example, the system error stream, directly to the user, or to a preselected file.

It will therefore be seen that use of a message processor as described above in conjunction with one or more message repository files allows for great flexibility in the use of a standardized message processing facility. In order to provide support for a new national language, it is necessary only to provide a new repository file for that national language. Messages can be changed, added, or deleted, simply by modifying the message repository file. If changes are made to the application program it is not necessary to recompile the message processor 12. Since the message processor 12 is an independent procedure invoked using a standard format, it is possible to use it with application programs written in different programming languages.

Another advantage obtainable using the preferred embodiment is the use of a single source file defining the messages to be supported by the system. This source file may be used by a preprocessor to provide documentation, generate the message repository files, and generate source code to be placed into the invoking application to properly interface such application with the message processor.

Figure 4:
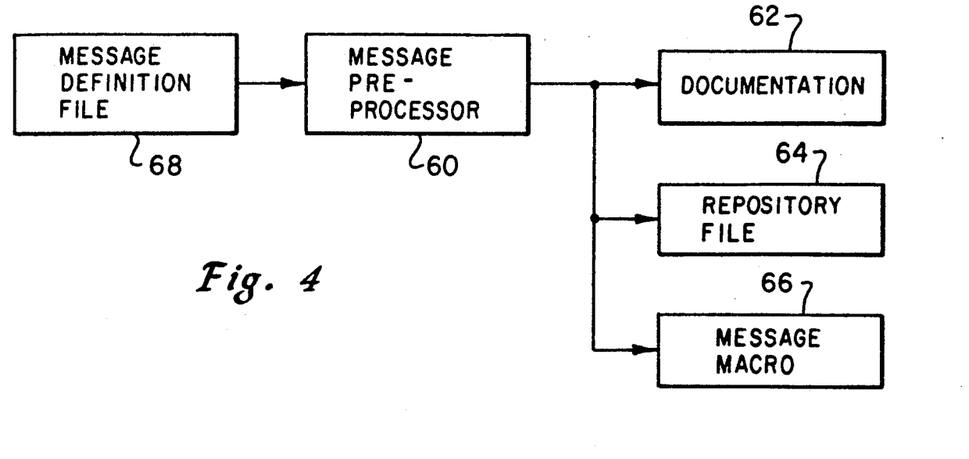
FIG. 4 is a high level block diagram illustrating functions performed by a message preprocessor.

Referring to FIG. 4, a system is shown which uses a message preprocessor 60 to generate a documentation file, a message repository file, and source code macros for inclusion in the source code file of the calling application. As will be described in further detail in connection with FIG. 5-7, the message preprocessor 60 performs these functions on a message definition file 68. The message definition file 68 is simply a text file which defines the format of each message. This format definition may be made in any convenient standard form.

For each message defined by the message definition file 68, information is included defining the message identifier, and the type of each message field. For each fixed field, a text string value for that field is set forth, and for variable fields the type of variable and printed format specification are included.

Figure 5:
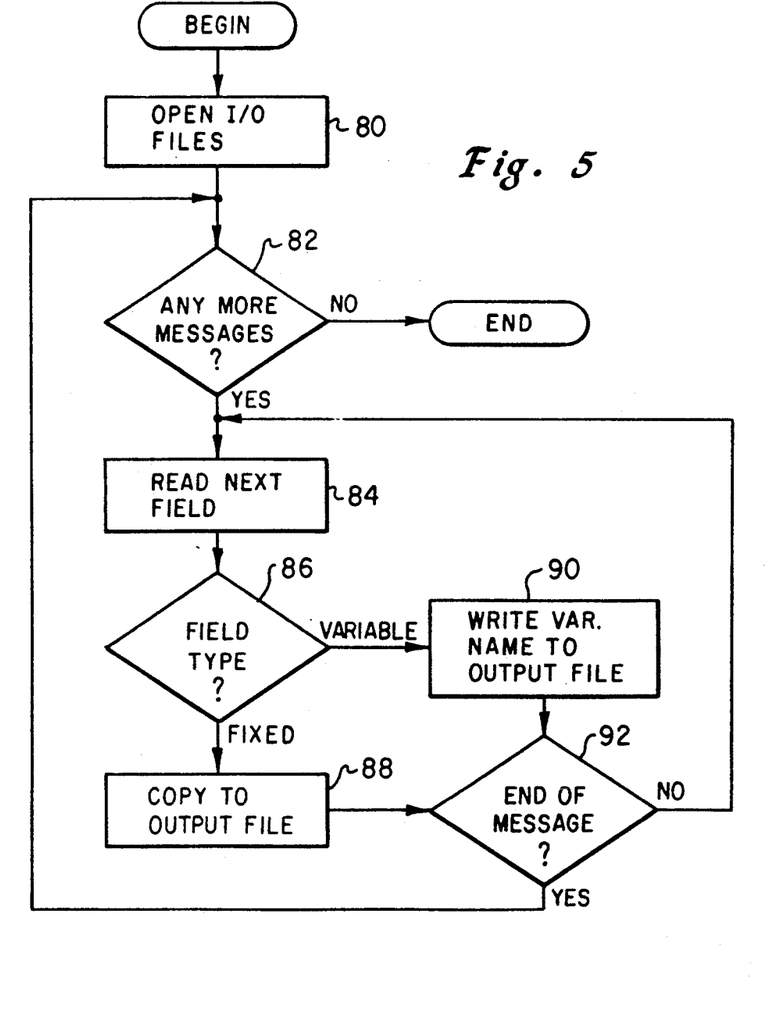
FIG. 5 is a flowchart describing operation of the message preprocessor to generate documentation.

Referring to FIG. 5, a preferred method is shown by which the message preprocessor 60 generates a documentation file 62 from a message definition file 68. First, the input/output files are opened 80. A text file is open for output as the documentation file 62, and the message definition file 68 is open for input. An outer loop is then entered beginning with step 82. In step 82, if no more messages remain to be processed in the message definition file 68, the procedure ends.

If messages do remain to be processed, an inner loop consisting of steps 84-92 is entered. Within this loop, each field is read 84 from the message definition file 68, and its field type checked 86. If it is a fixed field, its value is simply copied to the output file 88. If the field is a variable field, the variable name, found in the variable field declaration as described in connection with FIG. 2, is copied to the output file 90. If this is not the last field in this message 92, control returns to step 84. If this is the end of the message 92, control returns to step 82.

The documentation file created by the procedure of FIG. 5 is a series of listings showing the output format of the various messages in the message definition file. If desired, additional descriptive comments can be included in special comment fields within the message definition file 68, and these descriptive comments can be copied over to the documentation file 62.

Figure 6:
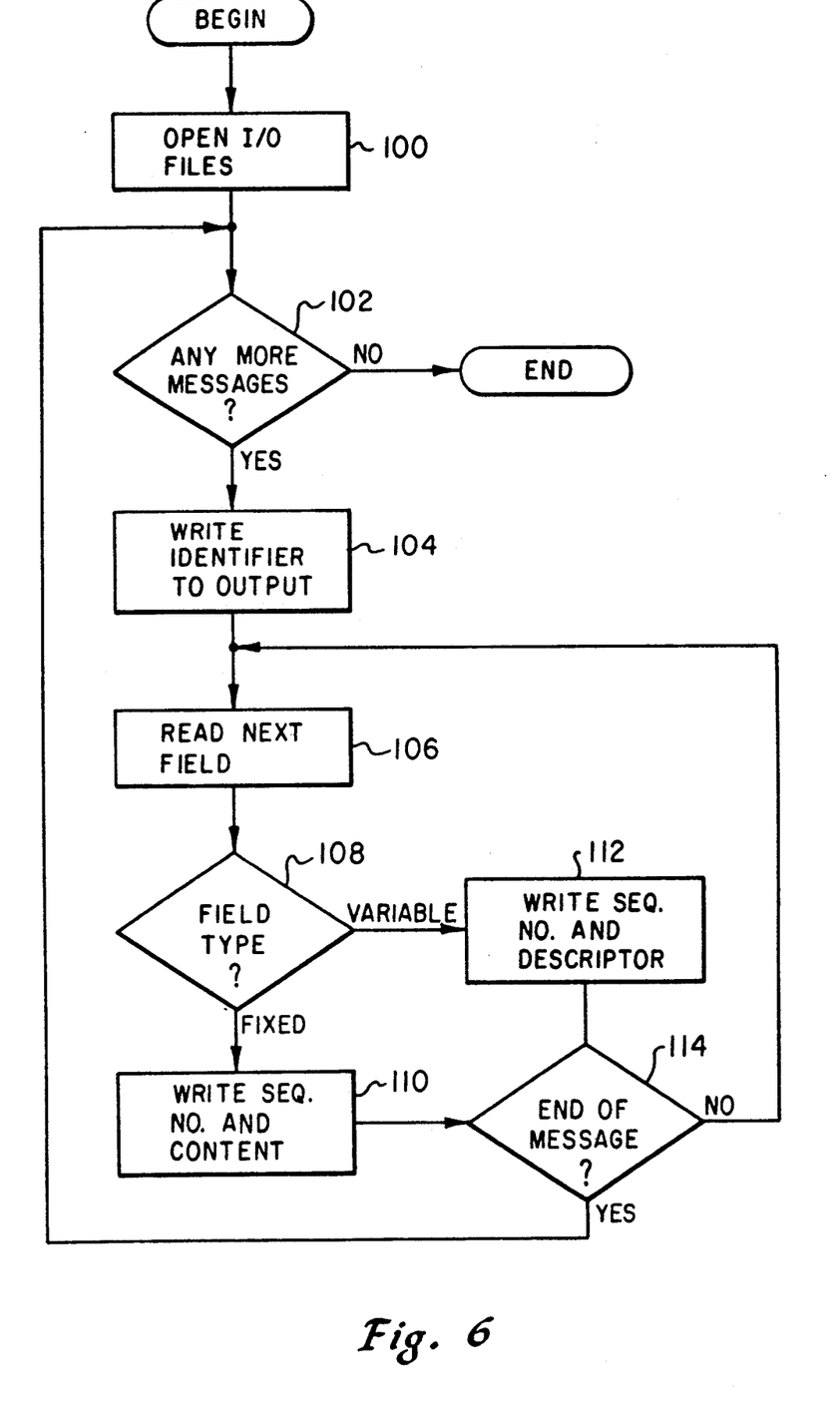
FIG. 6 is a flowchart describing operation of the message preprocessor to generate a repository file.

Referring to FIG. 6, a procedure is shown by which the message preprocessor 60 generates a message repository file 64. To start, the message definition file 68 is opened for input and the message repository file 64 is opened for output 100. An outer loop is then entered, and a check is made to see if any more messages remain to be processed 102 from the message definition file 68. If no messages remain, the procedure ends.

If any messages do remain, a new entry is created in the repository file 64 and the message identifier is written into that entry 104. The procedure then enters an inner loop in which the next field is read 106 from the message definition file 68. The field type is checked 108, and if it is a fixed field an identifying sequence number and the content of the field are written to the repository file 110. If the field is a variable field, an identifying sequence number and a variable field descriptor is written into the repository file 112 as described in connection with FIG. 2. The variable field descriptor written in step 112 preferably contains the variable name, variable type, and formatting information, often referred to as the picture.

After the information corresponding to a field has been written into the message repository file 64, a check is made to see if this is the last field of the message 114. If not, control returns to step 106. If this is the end of the message, control returns to the top of the outer loop at step 102.

As can be seen by comparison of the flowcharts in FIGS. 5 and 6, many similar operational steps are performed when generating the documentation file 62 and the message repository file 64. As will be seen in connection with FIG. 7, this is also true when generating the message application source code macro file 66. Thus, it is possible to generate all three of these files 62, 64, 66 at the same time, if desired, from a single source input.

Figure 7:
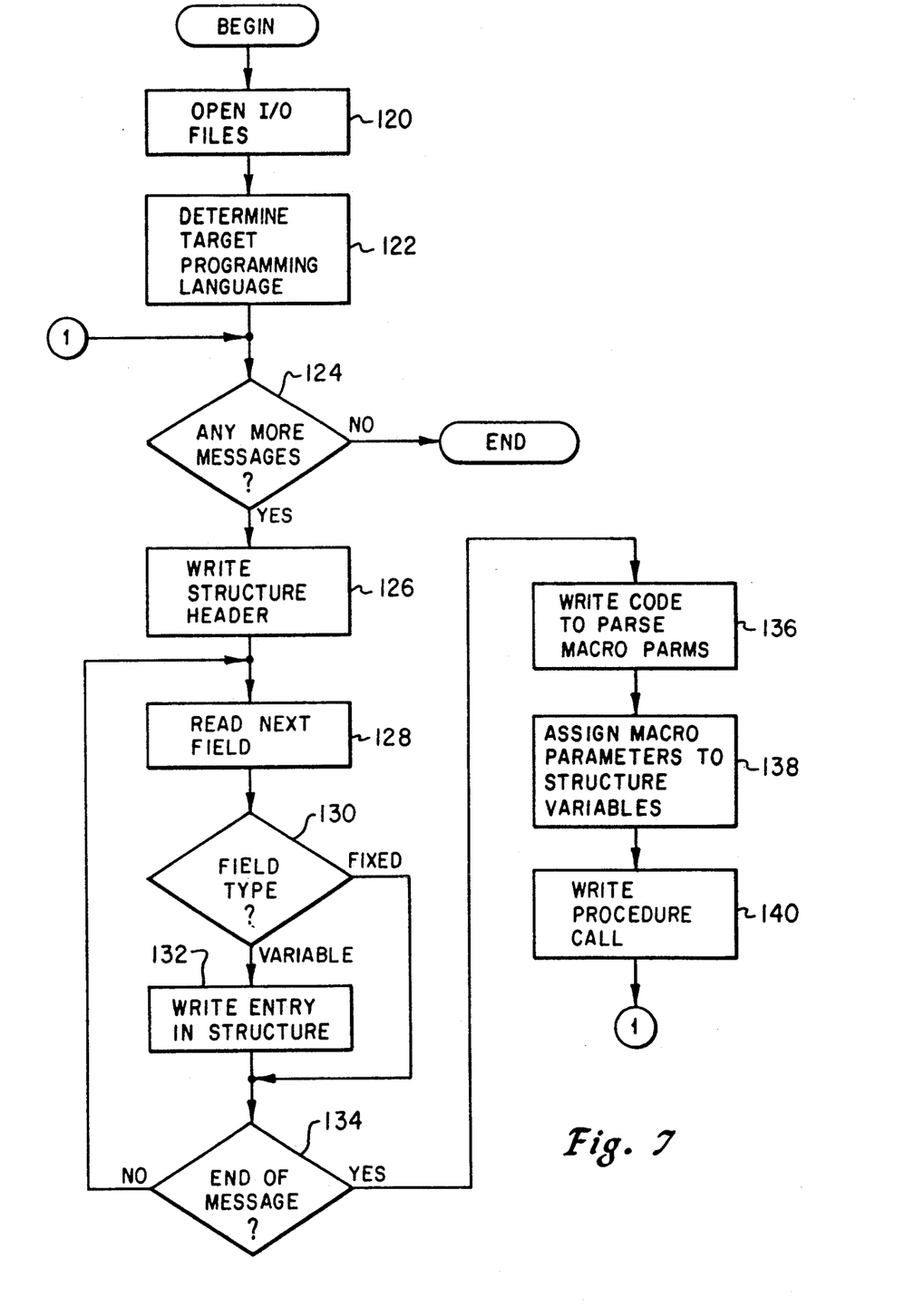
FIG. 7 is a flowchart describing operation of the message preprocessor to generate source code macros for inclusion in an application source file.

Referring to FIG. 7, a procedure is shown for the message preprocessor 60 to generate the source code macros for insertion into the source code of the invoking application. First, the message definition file 68 is opened for input and the message macro file 66 is opened for output 120. Typically, the source code needed for all messages is included in a single message macro file 66 which is included in the source of the operating system 10 during compilation. The message preprocessor 60 then determines the target language 122, which is the language in which the invoking application is written. This is typically supplied by a command line switch when the message preprocessor 60 is invoked.

An outer loop is then entered, and the message definition file 68 is checked to see if there are any more messages 124. If not, the procedure completes. If there are more messages to process, it is necessary to define a data structure for use by the invoking application to pass a message. Therefore, a structure header is written out 126. The structure header contains the code to define a data structure, as well as field definitions for the message identifier field and variable field descriptors. The procedure then enters an inner loop and reads the next field 128 within the message. The field type is checked 130, and if it is a variable field a corresponding entry is written into the source code data structure 132. Fixed fields are simply skipped, with control passing to step 134. If this is not the last field of the message 134, control returns to step 128. If this is the end of the message 134, control passes to step 136.

At this point, a user-defined structured data type has been defined in source code within the message macro file 66. Each variable to be passed has a descriptor field and a value field defined in the structure. In general, rather than burdening the writer of the calling application with the details of passing parameters to the message processor 112, it is preferable to write a macro which is translated at compile time into the necessary instructions to allocate space for a memory object to be passed to the message processor 12, and place the appropriate values into it. Use of macros in such manner, in general, is well known to those skilled in the art.

Therefore, the next step is to write code into the message macro file 66 to parse the macro parameters 136 and assign them to the corresponding variables within the data structure 138. The last step in the macro is to invoke the message processor 12, and pass it a pointer to the allocated structure. The structure was allocated space during step 136 or step 138, and is defined by the type defined during steps 126 through 134.

As will be appreciated by those skilled in the art, the system described above provides for greatly simplified generation and maintenance of a message generation facility suitable for use with multiple national languages. A standard message processor procedure can be used by many different applications. Such procedure need not be recompiled or relinked when a new national language becomes supported by an existing application, because all of the national language dependent information is contained in the message repository files.

Since the message processor accepts data in a standard format, it can be used with application programs written in different programming languages. It is preferably provided as a run-time module which is simply linked to the application program at link time. The message preprocessor handles the generation of interface source code which must be included in the source file of the application at compile time, so that the application programmer is not burdened with these details. A single message description file can be used by the preprocessor to generate source code macros, the message repository file, and documentation.

While the invention has been particularly shown and described with reference to a preferred embodiment, it will be understood by those skilled in the art that various changes in form and detail may be made therein without departing from the spirit and scope of the invention.

We claim:

1. In a digital data processing system, a system for generating messages in a selected national language, comprising:

a plurality of message repositories accessible to the data processing system, each repository corresponding to a single national language and having a plurality of entries, each entry having an identifier and defining fixed field and syntax information for a single message;

an application executing on the data processing system, wherein the application generates data corresponding to a selected message in a selected national language, wherein the generated data includes a message identifier, and further includes a plurality of paired variable values and variable descriptors;

a message processor executing on the data processing system, wherein the message processor accepts the message data generated by the application, selects an entry in a selected repository corresponding to the message identifier, generates a message containing fixed fields for the selected entry and the variable values, wherein the location of the variable values within the message is determined by matching the variable descriptors with the syntax information for the message, and wherein the message processor returns the generated message to the application.

2. A computer system as set forth in claim 1, wherein the message syntax information contained in each entry includes variable position information and associated variable field descriptors containing a field name, wherein the variable descriptor supplied by the application also contains a field name, and wherein the variable value supplied by the application is positioned in the generated message by comparing its associated field name with the field names contained in the selected entry and placing the variable value in a corresponding position.

3. A computer system as set forth in claim 1, further comprising:

message preprocessor means for generating said first file from a message description file which defines message syntax.

4. A computer system as set forth in claim 3, wherein said message preprocessor means includes means for generating, responsive to the message description file, program source code to be inserted into source code for an invoking application upon compilation thereof, wherein such inserted source code includes means for interfacing the invoking application with the message processor.

5. The computer system of claim 1, wherein the message generator is invoked using a standard format independent of a programing language in which an invoking application is written.

6. A method for generating a message in a data processing system, comprising the steps of:

in an application executing on the data processing system, generating data corresponding to the message, such data including a message identifier and a plurality of paired variable descriptors and variable values;

selecting a message repository corresponding to a desired national language for the message;

selecting from the selected repository an entry corresponding to the message identifier, such entry further including fixed field and syntax information for the message;

matching the variable values with the fixed field information for the message utilizing the variable descriptors and the syntax information;

generating the message from the matched fixed field information and the variable values; and returning the message to the application.

7. A method as set forth in claim 6, wherein the message syntax includes variable field descriptors and wherein the variable descriptors are compared to the variable field descriptors contains in the message syntax to determine a location for the paired variable values within the output message.

8. The method of claim 6, further comprising the step of:

generating the repository file from a message description file.

* * * * *